July 28, 1959
L. EIGNER
2,896,650
CAMPING ATTACHMENT FOR AUTOMOBILES
Filed June 13, 1956
3 Sheets-Sheet 1
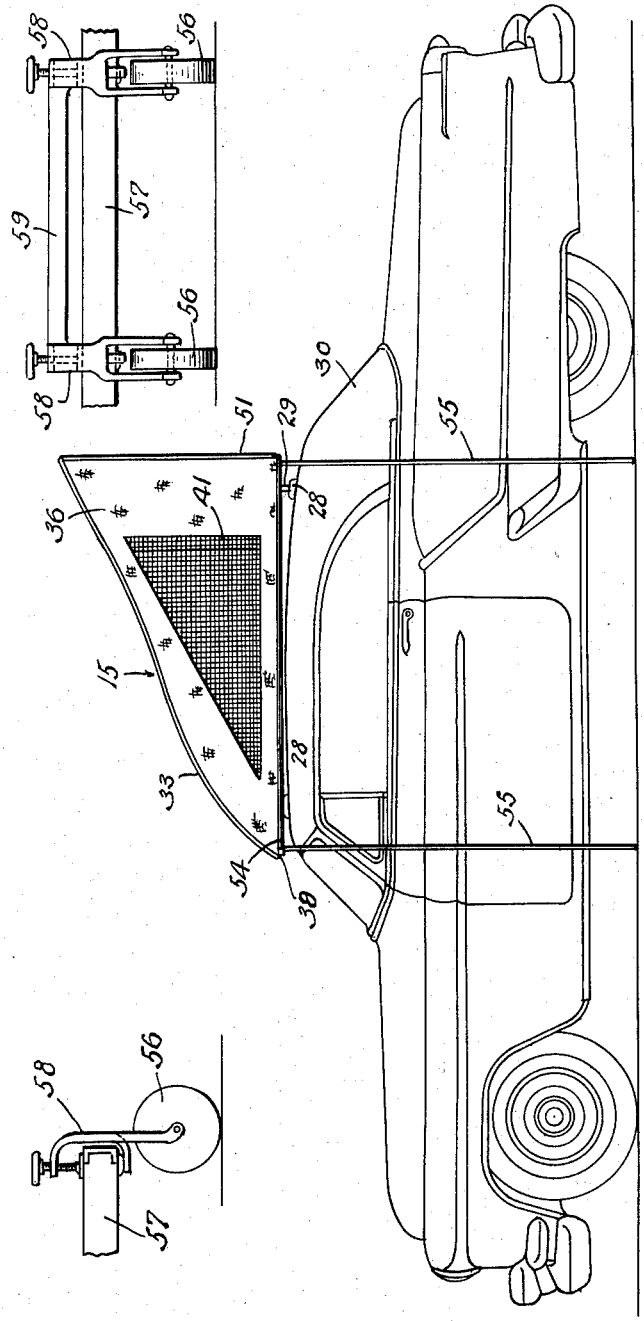
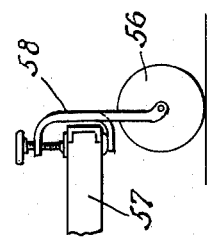
INVENTOR.
Leo Eigner
BY Patrick D. Beavers
ATTORNEY.

July 28, 1959  L. EIGNER  2,896,650
CAMPING ATTACHMENT FOR AUTOMOBILES
Filed June 13, 1956  3 Sheets-Sheet 2
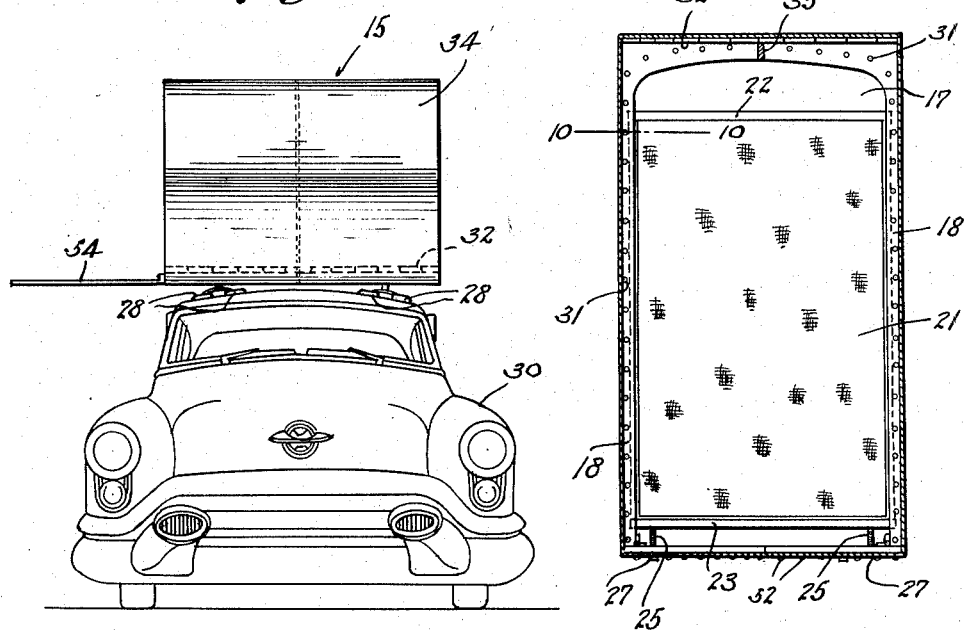
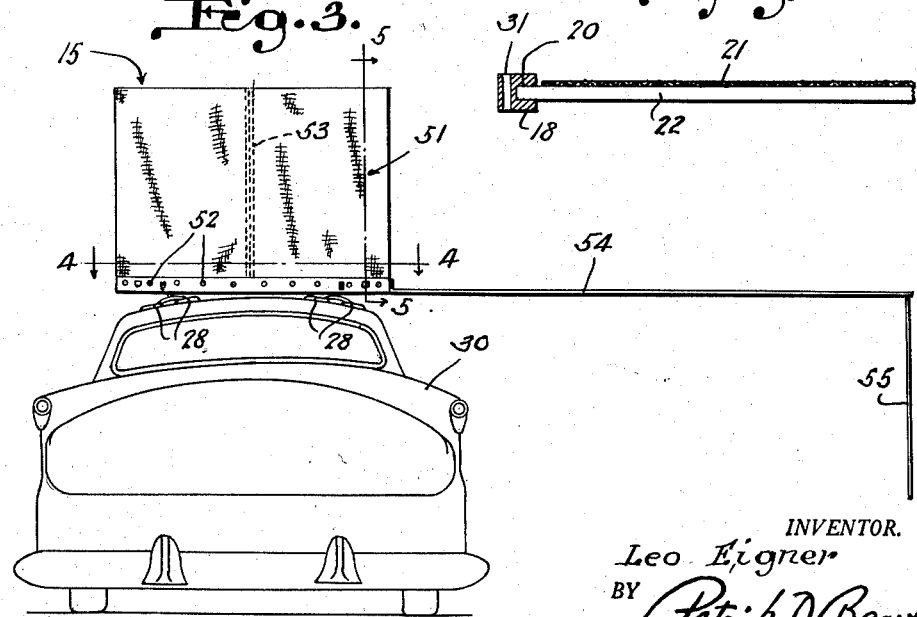
INVENTOR.
Leo Eigner
BY Patrick D. Beavers
ATTORNEY.

July 28, 1959     L. EIGNER     2,896,650
CAMPING ATTACHMENT FOR AUTOMOBILES
Filed June 13, 1956     3 Sheets-Sheet 3
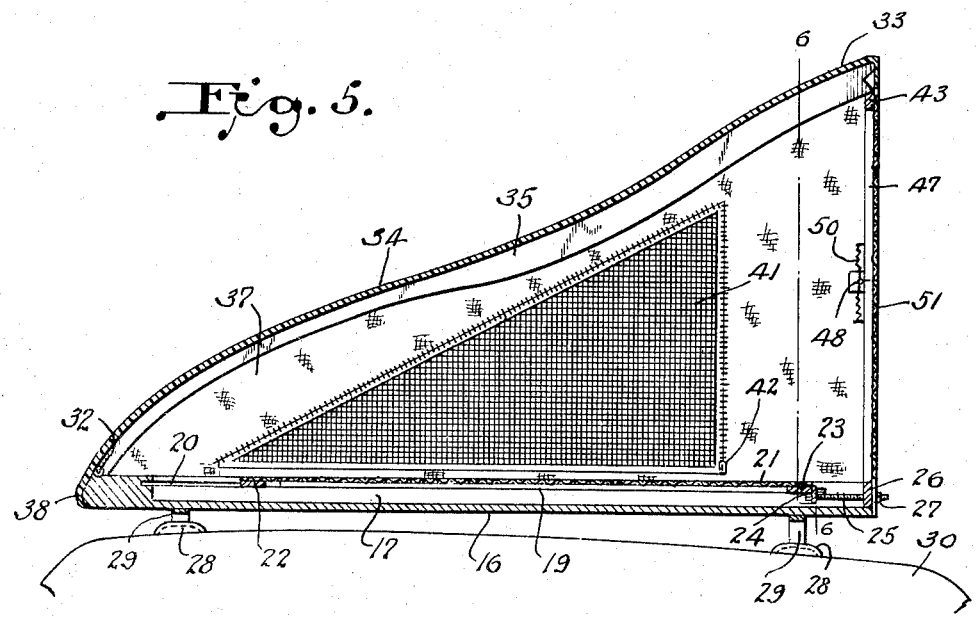
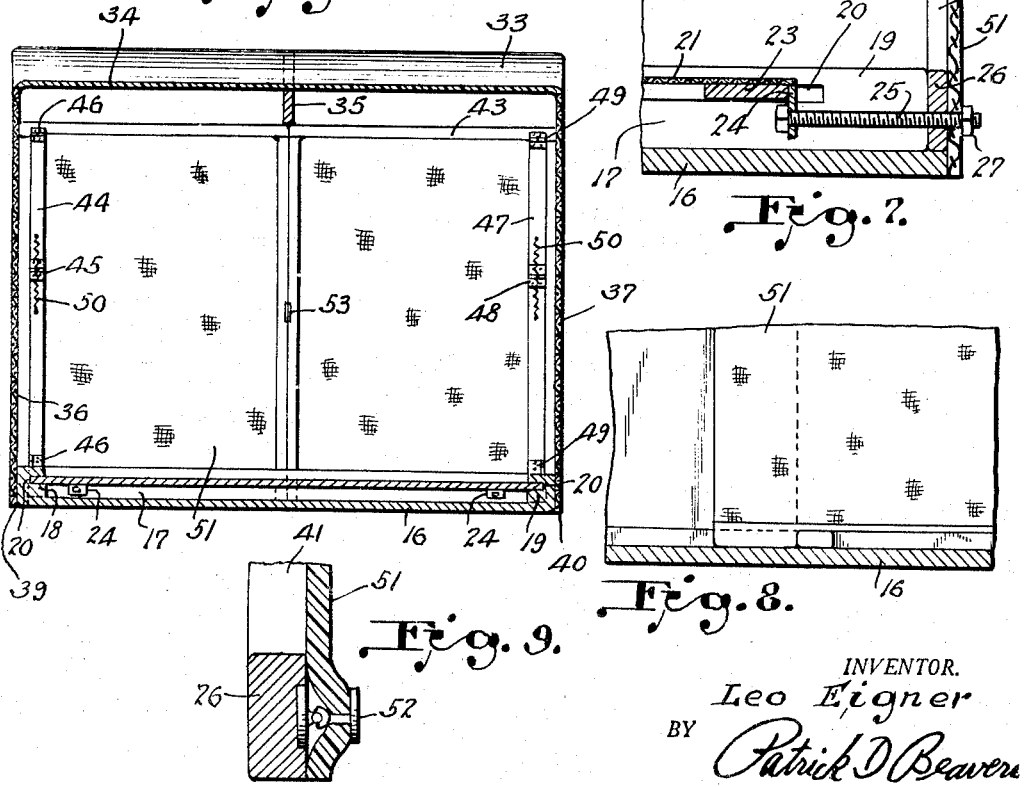
INVENTOR.
Leo Eigner
BY Patrick D. Beaver
ATTORNEY.

2,896,650

CAMPING ATTACHMENT FOR AUTOMOBILES

Leo Eigner, Albuquerque, N. Mex.

Application June 13, 1956, Serial No. 591,149

1 Claim. (Cl. 135—1)

This invention relates to improvements in camping devices that may be attached to a hard top automobile.

An object of the invention is to provide a camping attachment for an automobile that can be used anywhere that is passable for the automobile to which it is attached.

Another object of the invention is to provide a camping attachment that, once attached, will in no way interfere with the backing of the automobile.

The automobile can also be parked at a curb, in a parking space when the attachment is in place.

Another object of the invention is to provide a camping attachment for automobiles that cannot be invaded by land reptiles or the like. However, if desired the attachment may be detached and placed on the ground.

A further object of the invention is to provide a camping attachment for automobiles that is easy to install, will sleep two people and will protect the occupant against rain or shine.

With the above and other objects and advantages in view, the invention consists of the novel details of construction, arrangement and combination of parts more fully hereinafter described, claimed and illustrated in the accompanying drawings in which:

Fig. 1 is a side elevational view of an automobile showing a camping attachment embodying the invention attached thereto;

Fig. 2 is an elevational view of the front end of the automobile and the rear of the attachment;

Fig. 3 is an elevational view of the rear end of the automobile and the front of the attachment;

Fig. 4 is a transverse sectional view on the line 4—4 of Fig. 3;

Fig. 5 is a vertical sectional view on the line 5—5 of Fig. 3;

Fig. 6 is a vertical sectional view on the line 6—6 of Fig. 5;

Fig. 7 is a detailed fragmentary sectional view of the attaching bolts for the canvas bed;

Fig. 8 is a detailed fragmentary sectional view;

Fig. 9 is a detailed fragmentary sectional view of the snap fasteners for the canvas drop;

Fig. 10 is a detailed fragmentary sectional view on the line 10—10 of Fig. 4;

Fig. 11 is an end view of the caster attachment for the device; and

Fig. 12 is an elevational view of the caster attachment.

Referring more in detail to the drawings, wherein like parts are designated by like reference numerals, the reference numeral 15 is used to generally designate a camping attachment embodying the invention.

The attachment 15 comprises a floor 16 provided with a recess 17 which provides storage space.

The recess 17 provides two longitudinally extending rails 18 and 19, respectively. Each of the rails 18 and 19 has a longitudinally extending slot 20 therein to receive a canvas bed 21.

A crossbar 22 is secured to the rear end of the bed 21 and is fixed at its opposite ends in the slots 20 in the rails 18 and 19.

A second crossbar 23 is fixed to the front end of the bed 21 and is movably mounted at its opposite ends in the slots 20 in the rails 18 and 19.

Plates 24 having openings therein are secured to the crossbar 23, adjacent the opposite ends thereof, and the openings receive one end of a pair of bolts 25. The bolts 25 pass through openings in a bottom crossbar 26 that is secured to the front end of the floor 16. Nuts 27, when screwed onto bolts 25, will tend to stretch and tighten the canvas bed 21, Fig. 7.

A suction cup 28 is attached to each corner of the floor 16 by bracket 29 and the suction cups 28 are positioned on the hard top of an automobile 30, as shown in Figs. 1 to 4 inclusive. The floor 16 is also provided with spaced openings 31 to lighten the weight of the attachment.

Secured to the rear end of the floor 16 is a piano hinge 32. Secured to the piano hinge 32 in covering relation to the floor 16 is a canopy or tent body 33. The top 34 is plastic and is concavo-convex in longitudinal section and a strengthening rib or backbone 35 is secured to the median line of the top 34 and extends longitudinally thereof.

Canvas sides 36 and 37, respectively, are secured to the longitudinal side edge of the top 34 and the top overhangs the rear end of the floor 16 as at 38, Fig. 5, and the lower longitudinal edges of the sides 36 and 37 depend from the top 34 to a line contiguous with the outer undersurface of the floor 16, as at 39 and 40, Fig. 6.

Each side is provided with a substantially triangular shaped mosquito bar or screen 41, Figs. 1 and 5, a slide fastener 42 being attached to the inside of the sides 36 and 37 along two sides of the screens 41 to permit the same to be opened if desired.

A top crossbar 43 is secured to the front edge of the top 34. A side curtain bar 44 is sectional and is hinged at the center as at 45 and the opposite ends of the bar 44 are connected by hinges 46 to the bars 26 and 43, respectively. A similar bar 47 hinged at its center at 48 is connected at the opposite ends by hinges 49 to the bars 26 and 43, respectively. Springs 50 extend over the hinges 45 and 48 and are connected at their opposite ends to the bars 44 and 47 to place tension on the hinges 45 and 48 to retain the bars 44 and 47 in vertical relation to the floor 16.

Two sections of a canvas drop 51 are secured at three sides thereof to the bars 43, 45 and 47 and the lower or remaining edge is secured by snap fasteners 52, Fig. 9, to the crossbar 26, a slide fastener 53 retaining the center vertical meeting edges of the sectional drop 51 in closed relation to each other.

There is an awning 54 secured to one longitudinal edge of the attachment 15 and vertically disposed rods 55 support the outer corners of the awning 54 as shown in Figs. 1 and 3.

In order to position the attachment on the top of the car 30, caster wheels 56 are connected to a carrier bar 57 by means of C clamps 58 which are joined in spaced relation to each other by a connecting bar 59. When the attachment 15 is in proper position on the top of the car 30 the carrier bar 57 and caster wheels 56 are removed.

It is believed that the mounting of the attachment will be apparent to those skilled in the art. However, after it is attached and the car is ready for travel the bars 44 and 47 are collapsed by means of the hinges and the top 34 is folded down onto the floor 16 by means of the hinge 32. Thus a compact assembly is achieved that will not be damaged by the wind created by the movement of the automobile.

Latches may be provided to retain the top 34 in closed relation to the floor 16.

Thus a camping attachment is provided that when in use will achieve the objects of the invention.

It is believed that from the foregoing description the structure and method of application of the invention will be clear to those skilled in the art.

It is also to be understood that changes in the minor details of construction, arrangement and combination of parts may be resorted to provided they fall within the spirit of the invention and the scope of the appended claim.

Having thus described the invention what is claimed as new and desired to be secured by Letters Patent is:

A camping attachment for automobiles comprising a floor, a top portion hingedly connected to one end of said floor, flexible sides connected to said top portion and a sectional drop curtain connected to the forward end of said top and depending from said top to a line contiguous with the floor, means for connecting the lower edge of said drop curtain to said floor, a reinforcing rib provided for said top, a frame provided for the drop curtain, said frame being hingedly attached to said floor and said top, said frame comprising vertical bars, divided at the central portion, which provide sections hingedly connected together so that the camping attachment can be folded to a small compact.

References Cited in the file of this patent
UNITED STATES PATENTS

| | | |
|---|---|---|
| 373,513 | Benjamin | Nov. 22, 1887 |
| 783,705 | Shaw | Feb. 28, 1905 |
| 1,417,802 | Cosper | May 30, 1922 |
| 2,291,900 | Jimmes | Aug. 4, 1942 |
| 2,640,204 | Cutler | June 2, 1953 |
| 2,710,977 | Fannin | June 21, 1955 |